US012380577B1

(12) United States Patent
Wu et al.

(10) Patent No.: US 12,380,577 B1
(45) Date of Patent: Aug. 5, 2025

(54) ICE FLOE MOTION PREDICTION METHOD, DEVICE, STORAGE MEDIUM, AND ELECTRONIC DEVICE

(71) Applicant: Northwest Institute of Eco-Environment and Resources, Chinese Academy of Sciences, Lanzhou (CN)

(72) Inventors: Adan Wu, Lanzhou (CN); Tao Che, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 0 days.

(21) Appl. No.: 19/184,373

(22) Filed: Apr. 21, 2025

(30) Foreign Application Priority Data

Apr. 22, 2024 (CN) .......................... 2024104817087

(51) Int. Cl.
G06T 7/215 (2017.01)
G06T 7/246 (2017.01)
G01C 21/20 (2006.01)

(52) U.S. Cl.
CPC .............. *G06T 7/248* (2017.01); *G06T 7/215* (2017.01); *G01C 21/203* (2013.01); *G06T 2207/20084* (2013.01); *G06T 2207/20221* (2013.01); *G06T 2207/30241* (2013.01)

(58) Field of Classification Search
CPC ................................ G06T 7/215; G06T 7/245
See application file for complete search history.

(56) References Cited

U.S. PATENT DOCUMENTS

2014/0313072 A1  10/2014 Soofi et al.
2022/0207872 A1*  6/2022 Ren ........................ G06N 3/044

FOREIGN PATENT DOCUMENTS

CN  116012047 A  4/2023
CN  117437543 A  1/2024
KR  101968699 B1  8/2019

OTHER PUBLICATIONS

Zheng, Fu-Qiang et al. Prediction of independent sea ice motion in Arctic channel based on Multiloss-SAM-ConvLSTM, J. Infrared Millim. Oct. 2022, vol. 41, No. 5, 894-904, English Abstract.
Office Action, CN Patent Application No. 202410481708.7, dated Aug. 9, 2024, 8 pages.
Notification to Grant Patent Right, CN Patent Application No. 202410481708.7, dated Sep. 6, 2024, 1 page.

* cited by examiner

*Primary Examiner* — Sam Bhattacharya
(74) *Attorney, Agent, or Firm* — Casimir Jones, S.C.; Robert A. Goetz

(57) ABSTRACT

The present disclosure provides an ice floe motion prediction method, a device, a storage medium, and an electronic device. In the method, the electronic device is configured to acquire a historical motion information sequence of ice floe in a to-be-navigated region, wherein the historical motion information sequence includes multiple pieces of historical motion information of the ice floe at different time points; invoke a motion prediction model to analyze a spatiotemporal relationship of the multiple pieces of historical motion information; and obtain motion prediction information of the ice floe in the to-be-navigated region.

8 Claims, 2 Drawing Sheets

ICE FLOE MOTION PREDICTION METHOD, DEVICE, STORAGE MEDIUM, AND ELECTRONIC DEVICE

CROSS-REFERENCE TO RELATED APPLICATIONS

The present disclosure claims the priority to the Chinese patent application with the filling No. 2024104817087 filed with the Chinese Patent Office on Apr. 22, 2024, and entitled "ICE FLOE MOTION PREDICTION METHOD, DEVICE, STORAGE MEDIUM, AND ELECTRONIC DEVICE", the contents of which are incorporated herein by reference in entirety.

TECHNICAL FIELD

The present disclosure relates to the field of route planning, and specifically, to an ice floe motion prediction method, a device, a storage medium, and an electronic device.

BACKGROUND ART

Predicting the drifting trajectory of ice floe is of great significance for ship route planning. Taking Arctic shipping as an example, for the ice floe on the surface of the Arctic Sea, predicting its drifting trajectory can provide accurate information on ice floe motion and distribution, helping ships plan routes that avoid ice floe-dense regions, thereby reducing navigation risks. By predicting the drifting trajectory of ice floe, ships can select safer and more efficient routes, thus saving time and fuel costs and improving navigation efficiency and safety. In addition, predicting the drifting trajectory of ice floe can provide important data support for environmental protection and climate change research in the Arctic region.

However, Arctic shipping typically navigates through a marginal ice zone (MIZ) (a region where ice floe density is 15%-80%). The Arctic marginal ice zone (hereinafter referred to as the edge region) experiences significant variations in ocean wind, waves, and currents, which induce more pronounced fragmentation, deformation, and drifting of the ice floe, leading to uncertainty in route selection. To scientifically and dynamically plan routes, in addition to accurately distinguishing large independent ice floe, ice debris, and ice-water mixtures in the ice floe region, it is more important to combine the motion trajectory of independent ice floe and predict the movement trend of independent ice floe within a short future period. This enables the re-evaluation of the navigability of the upcoming sea area, allowing for dynamic route adjustments, which is crucial for the safe navigation of Arctic ships. However, most current studies related to Arctic route safety assurance do not reflect the rapid changes in ice floe within the Arctic marginal ice zone. Moreover, traditional research on movement monitoring and prediction for sea ice mostly focuses on the overall drifting trend of the sea ice (in the entire Arctic or a certain strait), but lacks research on the precision movement trajectory of independent ice floe in local water areas.

SUMMARY

In order to overcome at least one of the shortcomings of the prior art, the present disclosure provides an ice floe motion prediction method, a device, a storage medium, and an electronic device, relating to the field of route planning, which includes the following disclosure.

In a first aspect, the present disclosure provides an ice floe motion prediction method, wherein the method includes:
  acquiring a historical motion information sequence of ice floe in a to-be-navigated region, wherein the historical motion information sequence comprises multiple pieces of historical motion information of the ice floe at different time points; and
  invoking a motion prediction model to analyze a spatiotemporal relationship of the multiple pieces of historical motion information, and obtaining motion prediction information of the ice floe in the to-be-navigated region.

In combination with the optional embodiments of the first aspect, the motion prediction model comprises a spatiotemporal relationship layer and a fully connected layer; and the step of invoking a motion prediction model to analyze a spatiotemporal relationship of the multiple pieces of historical motion information, and obtaining motion prediction information of the ice floe in the to-be-navigated region includes:
  processing acquired historical spatiotemporal features and the historical motion information through the spatiotemporal relationship layer for each piece of historical motion information to obtain a motion trend feature of the ice floe at a corresponding time point, wherein the historical spatiotemporal features represent features extracted by the spatiotemporal relationship layer from the processed historical motion information; and
  processing multiple motion trend features obtained from multiple pieces of historical motion information through the fully connected layer to obtain the motion prediction information of the ice floe in the to-be-navigated region.

In combination with the optional embodiments of the first aspect, the spatiotemporal relationship layer comprises a feature extraction layer, a feature enhancement layer, and a recurrent neural network layer; and the step of processing acquired historical spatiotemporal features and the historical motion information through the spatiotemporal relationship layer to obtain a motion trend feature of the ice floe at a corresponding time point includes:
  extracting features from the historical motion information through the feature extraction layer to obtain initial features of the historical motion information;
  enhancing the initial features through the feature enhancement layer to obtain enhanced features of the initial features; and
  processing the historical spatiotemporal features and the enhanced features through the recurrent neural network layer to obtain a motion trend feature of the ice floe at the corresponding time point.

In combination with the optional embodiments of the first aspect, the feature enhancement layer is a self-attention mechanism layer, and the recurrent neural network layer is a convolutional long short-term memory network layer.

In combination with the optional embodiments of the first aspect, each piece of historical motion information comprises a position, a motion speed, and a motion direction of the ice floe.

In combination with the optional embodiments of the first aspect, the step of acquiring a historical motion information sequence of ice floe in a to-be-navigated region comprises:
  acquiring multiple historical images captured at different time points in the to-be-navigated region;

pairing every two historical images at adjacent time points into an image group based on the multiple historical images;

acquiring, for each image group, a position of the ice floe in each historical image within the image group; and obtaining one piece of historical motion information corresponding to the image group in the historical motion information sequence based on the position of the ice floe in each historical image within the image group.

In combination with the optional embodiments of the first aspect, the step of acquiring a position of the ice floe in each historical image within the image group includes:

fusing a first feature point sequence and a second feature point sequence of each historical image in the image group to obtain a fused feature point sequence of each historical image in the image group, wherein the first feature point sequence comprises corner points distributed uniformly, and the second feature point sequence is feature points distributed at texture positions; and processing the fused feature point of each historical image in the image group through a feature point matching model to obtain a position of the ice floe in each historical image in the image group.

In a second aspect, the present disclosure provides an ice floe motion prediction device, wherein the device includes:

a motion information module, configured for acquiring a historical motion information sequence of ice floe in a to-be-navigated region, wherein the historical motion information sequence comprises multiple pieces of historical motion information of the ice floe at different time points; and a motion prediction module, configured for invoking a motion prediction model to analyze a spatiotemporal relationship of the multiple pieces of historical motion information, and obtaining motion prediction information of the ice floe in the to-be-navigated region.

In combination with the optional embodiments of the second aspect, the motion prediction model comprises a spatiotemporal relationship layer and a fully connected layer; and specifically, the motion prediction module is further configured for:

processing acquired historical spatiotemporal features and the historical motion information through the spatiotemporal relationship layer for each piece of historical motion information to obtain a motion trend feature of the ice floe at a corresponding time point, wherein the historical spatiotemporal features represent features extracted by the spatiotemporal relationship layer from the processed historical motion information; and processing multiple motion trend features obtained from multiple pieces of historical motion information through the fully connected layer to obtain the motion prediction information of the ice floe in the to-be-navigated region.

In combination with the optional embodiments of the second aspect, the spatiotemporal relationship layer comprises a feature extraction layer, a feature enhancement layer, and a recurrent neural network layer; and specifically, the motion prediction module is further configured for:

extracting features from the historical motion information through the feature extraction layer to obtain initial features of the historical motion information;

enhancing the initial features through the feature enhancement layer to obtain enhanced features of the initial features; and processing the historical spatiotemporal features and the enhanced features through the recurrent neural network layer to obtain a motion trend feature of the ice floe at the corresponding time point.

In combination with the optional embodiments of the second aspect, the feature enhancement layer is a self-attention mechanism layer, and the recurrent neural network layer is a convolutional long short-term memory network layer.

In combination with the optional embodiments of the second aspect, each piece of historical motion information comprises a position, a motion speed, and a motion direction of the ice floe.

In combination with the optional embodiments of the second aspect, the motion information module is further configured for:

acquiring multiple historical images captured at different time points in the to-be-navigated region;

pairing every two historical images at adjacent time points into an image group based on the multiple historical images;

acquiring, for each image group, a position of the ice floe in each historical image within the image group; and obtaining one piece of historical motion information corresponding to the image group in the historical motion information sequence based on the position of the ice floe in each historical image within the image group.

In combination with the optional embodiments of the second aspect, the motion information module is further configured for:

fusing a first feature point sequence and a second feature point sequence of each historical image in the image group to obtain a fused feature point sequence of each historical image in the image group, wherein the first feature point sequence includes corner points distributed uniformly, and the second feature point sequence includes feature points distributed at texture positions; and processing the fused feature point sequence of each historical image in the image group through a feature point matching model to obtain a position of the ice floe in each historical image in the image group.

In a third aspect, a storage medium is provided in the present disclosure, wherein the storage medium stores a computer program, and, when the computer program is executed by a processor, the ice floe motion prediction method is implemented.

In a fourth aspect, an electronic device is provided in the present disclosure, wherein the electronic device includes a processor and a memory, the memory stores a computer program, and when the computer program is executed by the processor, the ice floe motion prediction method is implemented.

Compared with the prior art, the beneficial effects of the present disclosure are as follows.

The present disclosure provides an ice floe motion prediction method, a device, a storage medium, and an electronic device. In the method, the electronic device is configured to acquire a historical motion information sequence of ice floe in a to-be-navigated region, wherein the historical motion information sequence includes multiple pieces of historical motion information of the ice floe at different time points; invoke a motion prediction model to analyze a spatiotemporal relationship of the multiple pieces of historical motion information; and obtain motion prediction information of the ice floe in the to-be-navigated region. Thus, compared with the deficiency of directly using images of the to-be-navigated region to predict the motion status information of the ice floe, the present embodiment utilizes multiple pieces of historical motion information of the ice floe to avoid interference from factors such as ice floe fragmentation, melting, and deformation, thereby achieving a better prediction effect on the motion information of ice floe in an edge region of the ice floe.

BRIEF DESCRIPTION OF DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

Figure 1:
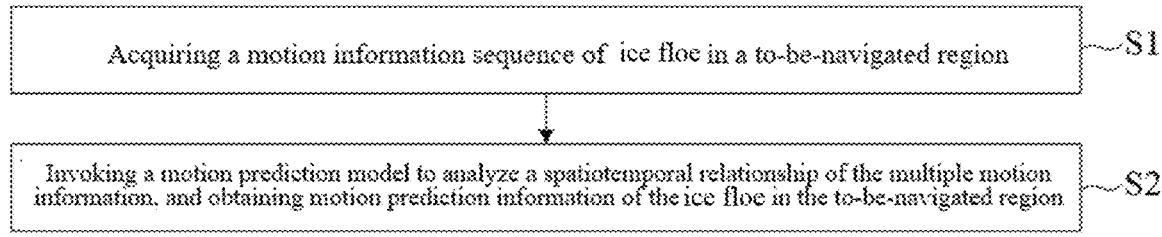
FIG. 1 is a step flowchart of an ice floe motion prediction method provided in the embodiment of the present disclosure.

Reference numerals: 11—motion information module; 12—motion prediction module; 21—memory; 22—processor; 23—communication unit; 24—system bus.

DETAILED DESCRIPTION OF EMBODIMENTS

In order to make the objective, technical solutions, and advantages of the embodiments of the present disclosure clearer, the following description will provide a clear and comprehensive explanation of the technical solutions in the embodiments of the present disclosure with reference to the drawings of the present disclosure. Clearly, the described embodiments are part of the embodiments of the present disclosure and not the entire embodiments. The components of embodiments of the present disclosure which are generally described and illustrated in the drawings herein can be arranged and designed in a variety of different configurations.

Accordingly, the following detailed description of the embodiments of the present disclosure provided in the drawings is not intended to limit the scope of the present disclosure for which protection is claimed, but merely represents selected embodiments of the present disclosure. Based on the embodiments in the present disclosure, all other embodiments obtained by those of ordinary skill in the art without making inventive efforts are within the scope of protection of the present disclosure.

It should be noted that similar numerals and letters denote similar terms in the following drawings so that once an item is defined in one drawing, it does not need to be further discussed in subsequent drawings.

In the description of the present disclosure, it should be noted that the orientation or positional relationship indicated by the terms "center", "up", "down", "left", "right", "vertical", "horizontal", "inside", "outside", etc. is based on the orientation or positional relationship shown in the drawings or the orientation or positional relationship in which the product of the present disclosure is customarily placed when used. It is intended only to facilitate the description of the present disclosure and to simplify the description, and not to indicate or imply that the devices or elements referred to must have a particular orientation, be constructed and operated in a particular orientation. Accordingly, it is not to be construed as a limitation of the present disclosure. In addition, the terms "first", "second" and "third" are only used to distinguish the descriptive and are not to be construed as indicating or implying relative importance.

Furthermore, the terms "comprise", "include", or any other variations are intended to encompass non-exclusive inclusion. This allows a process, method, item, or device that includes a series of elements to not only include those elements but also include other elements that are not explicitly listed, or elements that are inherent to the process, method, item, or device. In the absence of further limitations, the inclusion of an element specified by the phrase "comprising a . . . " does not exclude the presence of additional identical elements in the process, method, article, or apparatus that includes the specified element.

In addition, the terms "horizontal", "vertical" and "overhang" do not mean that elements are required to be absolutely horizontal or overhanging, but can be slightly inclined. For example, "horizontal" only means that its direction is more horizontal than "vertical", and it does not mean that the structure must be completely horizontal, but can be slightly inclined.

In the description of the present disclosure, it is further important to note that unless otherwise clearly stipulated and limited, the terms "provide", "mount", "interconnect", and "connect" should be understood in a broad sense, for example, it can be a fixed connection, a detachable connection, or an integral connection; it can be a mechanical connection, or an electrical connection; and it can be a direct connection, an indirect connection through an intermediary, or an internal communication between two components. Those of ordinary skill in the art can understand the meanings of the above terms in the present disclosure according to specific situations.

Based on the above statement, as introduced in the background technology, the current studies related to Arctic route safety assurance do not reflect the rapid changes in ice floe within the Arctic edge region.

In particular, early ice floe motion measurement mainly relied on ship observations, drift stations, and buoys, but the available data were limited and sparsely distributed. With the development of remote sensing technology, large-scale ice floe motion monitoring has become possible. Currently, various remote sensing data, such as passive microwave data, microwave scatterometer data, optical images, and synthetic aperture radar (SAR) data, are widely used in ice floe motion analysis. Passive microwave radiometers and microwave scatterometers typically have lower spatial resolutions, ranging from approximately 6.25 to 25 kilometers, which limits their application in high-resolution ice floe motion monitoring. Optical sensors are affected by cloud cover, which may limit the acquisition of the coverage of the ice floe motion vector. Nevertheless, optical images with low cloud cover remain a valuable resource for monitoring ice floe. In contrast, SAR images provide high spatial resolution, but the current revisit cycle does not meet the time resolution requirements for short-term ice floe motion prediction in Arctic shipping routes.

Traditional ice floe motion monitoring methods mainly include the pattern-matching method and the feature-tracking method. The pattern-matching method calculates ice floe displacement by identifying the highest correlation of intensity changes within grid units in consecutive images. However, it is not easy to capture the rotational characteristics of ice floe and is susceptible to image noise, which affects the accuracy of the obtained ice floe motion. Feature-tracking methods, such as SIFT, SURF, ORB, and A-KAZE, have also been applied to ice floe motion monitoring. Compared to pattern matching, feature-tracking methods offer higher accuracy in extracting ice floe motion vectors. For example, the A-KAZE algorithm is used to extract ice floe motion vectors from Sentinel-1 SAR data. The extracted feature vectors are fused with the 10 km spatial resolution ice floe motion product released by the Technical University of Denmark using the Kriging algorithm, thereby improving the spatial resolution to 1 km. However, since feature-tracking methods only match features, the resulting vectors may be spatially unevenly distributed, leading to gaps in regions of ice floe that lack good texture.

The above algorithms are primarily used for studying continuous ice floe motion. However, in the Arctic edge region during summer, where ice density is low, ice floe continuously rotates and moves, which reduces the similarity between sub-regions in consecutive images. Meanwhile, due to collisions, melting, and fragmentation during ice floe motion, the correlation of the same independent ice floe weakens (consecutive ice floe images exhibit a weaker correlation). In such cases, traditional pattern-matching and feature-point extraction methods struggle to effectively extract ice floe motion information.

In related technologies, considering that short-term prediction of ice floe motion is essentially a spatiotemporal sequence prediction problem, the optical flow method from computer vision is a traditional solution for such problems. These methods use the motion information and object structure information carried by the pixels in the optical flow vector to extrapolate the image sequence so as to obtain the predicted image at the next moment. However, practical application has revealed that in the Arctic edge region during summer, where ice density is low, the thickness of ice floe is limited, which causes it to easily break, melt, and deform as it continuously rotates and moves with ocean currents. This makes it difficult to establish spatiotemporal dependencies between ice floe in different images through image sequences, which will reduce the final prediction effect.

Based on the discovery of the above technical problems, the inventors have conducted inventive work and provided the following technical solutions to resolve or improve these problems. It should be noted that the defects in the prior art identified above are conclusions drawn by the inventors after practical experimentation and careful study. Therefore, the discovery process of the above-mentioned problems and the solutions proposed in the embodiments of the present disclosure for the above-mentioned problems below should all be the contributions made by the inventors to the present disclosure in the process of invention, rather than being regarded as common technical knowledge known to those skilled in the art.

In view of the above technical problems, the embodiment provides an ice floe motion prediction method. In the method, the electronic device is configured to acquire a historical motion information sequence of ice floe in a to-be-navigated region, wherein the historical motion information sequence includes multiple pieces of historical motion information of the ice floe at different time points; invoke a motion prediction model to analyze a spatiotemporal relationship of the multiple pieces of historical motion information; and obtain motion prediction information of the ice floe in the to-be-navigated region. Thus, compared with the deficiency of directly using images of the to-be-navigated region to predict the motion status information of the ice floe, the present embodiment utilizes multiple pieces of historical motion information of the ice floe to avoid interference from factors such as ice floe fragmentation, melting, and deformation, thereby achieving a better prediction effect on the motion information of ice floe in an edge region of the ice floe.

The electronic device implementing the method can be a mobile terminal, tablet computer, laptop computer, or desktop computer carried on a vessel. It can also be a server that is communicatively connected to the vessel. The server can be a single server or a server group. The server group can be centralized or distributed (e.g., the server can be a distributed system). In some embodiments, the server can be local or remote relative to the user terminal. In some embodiments, the server can be implemented on a cloud platform. As an example, the cloud platform can include a private cloud, public cloud, hybrid cloud, community cloud, distributed cloud, inter-cloud, multi-cloud, or any combination thereof. In some embodiments, the server can be implemented on an electronic device with one or more components.

To provide a clearer explanation of the solution presented in the embodiment, the following section will detail each step of the method with reference to FIG. 1. However, it should be understood that the operations of the flowchart can be implemented out of sequence, and steps without logical contextual relationships can be reversed in order or implemented simultaneously. Persons skilled in the art, guided by the contents of the present disclosure, may add one or more other operations to the flowchart and may remove one or more operations from the flowchart. As shown in FIG. 1, the method includes the following steps.

S1: acquiring a motion information sequence of ice floe in a to-be-navigated region.

The historical motion information sequence comprises multiple pieces of historical motion information of the ice floe at different time points. Crew members can predict the regions that the vessel is likely to pass through within a certain period based on a comprehensive judgment of the current position, heading, and speed of the vessel, and define the regions as the to-be-navigated region. Alternatively, crew members can estimate the regions the vessel will pass through within a certain period based on a predetermined route and navigation speed, and define the regions as the to-be-navigated region. It is important to note that the embodiment does not impose fixed requirements on the scope of the planned navigation region. In practical operations, adjustments can be made flexibly according to specific situations and needs. For example, the region covered by the route over the next 1-2 days can be selected as the to-be-navigated region.

Once the to-be-navigated regions are determined, multi-source remote sensing data, such as optical and SAR data, from the past period for the to-be-navigated region can be acquired. After analyzing these multi-source remote sensing data, multiple pieces of historical motion information of the ice floe within the to-be-navigated region at different time points are obtained. It should be noted that multiple pieces of historical motion information records can be periodic or non-periodic. For example, historical images of the to-be-navigated region from the past 5-10 days can be obtained daily. Then, by performing spatiotemporal analysis on the historical images from these 5-10 days, the historical motion information of the ice floe for each day can be obtained. Additionally, the embodiment does not impose specific limitations on the number of ice floe in the to-be-navigated region. The ice floe can be of one or multiple blocks. When multiple ice floe are present, the historical motion information for each ice floe per day can include information such as the position (feature point position), drift velocity, and drift direction of the ice floe.

To obtain the historical motion information of the ice floe for each day, it is first necessary to determine the position of the same ice floe in the historical images from two consecutive days. Then, based on the position of the ice floe in the historical images from two consecutive days, the physical positions of the ice floe from two consecutive days can be determined, thereby obtaining the drift velocity and drift direction of the ice floe. However, practical application has revealed that in the marginal ice zone of the Arctic, the thickness of ice floe is limited, which causes it to easily break, melt, and deform as it continuously rotates and moves with ocean currents. Therefore, conventional matching methods make it difficult to determine the position of the same ice floe in the historical images from two consecutive days. In this regard, the embodiment also provides an optional implementation of step S1, which specifically includes the following.

S1-1, acquiring multiple historical images captured at different time points in the to-be-navigated region.

S1-2, pairing every two historical images at adjacent time points into an image group based on the multiple historical images.

Exemplarily, assuming there are 5 historical images, arranged in chronological order as $p_1$, $p_2$, $p_3$, $p_4$, $p_5$, then $p_1$, $p_2$ can be paired as an image group, $p_2$, $p_3$ can be paired as an image group, $p_3$, $p_4$ can be paired as an image group, and $p_4$, $p_5$ can be paired as an image group.

S1-3, acquiring, for each image group, a position of the ice floe in each historical image within the image group.

In some optional embodiments, the electronic device can fuse a first feature point sequence and a second feature point sequence of each historical image in the image group to obtain a fused feature point sequence of each historical image in the image group, wherein the first feature point sequence includes corner points distributed uniformly, and the second feature point sequence includes feature points distributed at texture positions; and process the fused feature point sequence of each historical image in the image group through a feature point matching model to obtain a position of the ice floe in each historical image in the image group.

Exemplarily, since feature extraction and matching are key to achieving dynamic monitoring of ice floe in the to-be-navigated region, and the shape of ice floe in the ice edge region can change due to melting, fracturing, or connection with surrounding ice floe, dynamic analysis of ice floe requires a large number of reliable feature points. Through research, it has been found that the feature points extracted by the SuperPoint model are uniformly distributed corner points with good distinctiveness, and the feature points extracted by the Disk model are often located in texture-rich areas. Therefore, the present embodiment leverages the advantages of both the SuperPoint and Disk deep learning feature extraction algorithms and fuses the results of these two methods to obtain more and more accurate feature points. Finally, the SuperGlue deep learning model is selected to match the feature points extracted from the two historical images, thereby determining the location of the same ice floe in both historical images.

Figure 2:
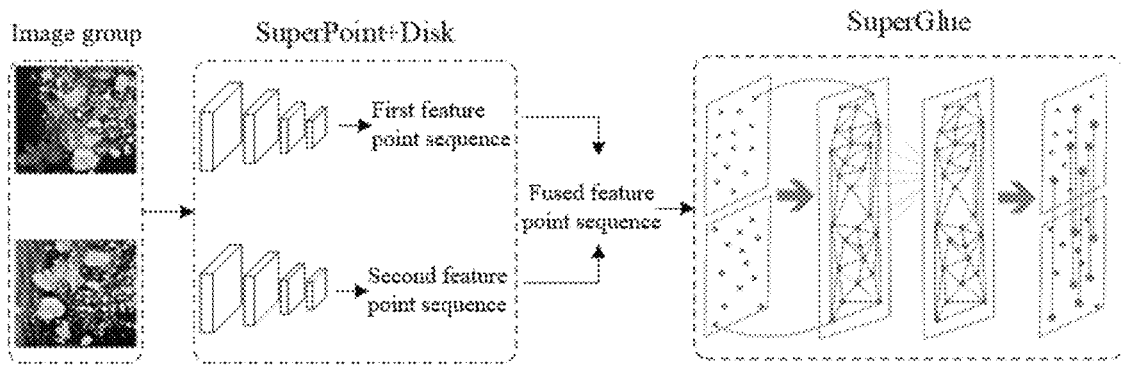
FIG. 2 is a schematic diagram of a feature point pairing principle provided in the embodiment of the present disclosure.

As shown in FIG. 2, for each historical image captured for the to-be-navigated region in the image group, the first feature point sequence of the historical image includes uniformly distributed corner points in the historical image, which can be input into the SuperPoint model for processing. The second feature point sequence includes feature points distributed in texture-rich areas of the historical image, which can be input into the Disk model for processing. Then, the first feature point sequence and the second feature point sequence are fused to obtain a fused feature point sequence. Finally, the fused feature point sequences of the two ice floe images are input into the SuperGlue model for feature point matching, thereby determining the position of the same ice floe in the two images.

Based on the location of the same ice floe in the two historical images obtained in the above embodiment, step S1 further includes:

S1-4, obtaining one piece of historical motion information corresponding to the image group in the historical motion information sequence based on the position of the ice floe in each historical image within the image group.

It can be understood that once the position of ice floe in each historical image within the image group is obtained, the drift distance and drift direction of the ice floe can be obtained. By combining the time difference between two historical images in the image group, the drift speed of the ice floe can be obtained. Therefore, the position, drift direction, and drift speed of the ice floe are regarded as one piece of historical motion information of the ice floe.

Based on the multiple pieces of motion information of the ice floe obtained in the above embodiment, referring to FIG. 1, the ice floe motion prediction method provided in the embodiment further includes:

S2, invoking a motion prediction model to analyze a spatiotemporal relationship of the multiple pieces of motion information, and obtaining motion prediction information of the ice floe in the to-be-navigated region.

In the embodiment, the motion prediction model includes a spatiotemporal relationship layer and a fully connected layer, wherein the spatiotemporal relationship layer is used to extract the motion trend features of the ice floe, and the fully connected layer is used to integrate all motion trend features to obtain the motion prediction information of the ice floe in the to-be-navigated region. Therefore, an optional implementation of step S2 includes:

S2-1, processing acquired historical spatiotemporal features and the historical motion information through the spatiotemporal relationship layer for each piece of historical motion information to obtain a motion trend feature of the ice floe at a corresponding time point.

The historical spatiotemporal features represent features extracted by the spatiotemporal relationship layer from the processed historical motion information. The spatiotemporal relationship layer can include a feature extraction layer, a feature enhancement layer, and a recurrent neural network layer. Therefore, the electronic device can extract features from the historical motion information through the feature extraction layer to obtain initial features of the historical motion information; enhance the initial features through the feature enhancement layer to obtain enhanced features of the initial features; and process the historical spatiotemporal features and the enhanced features through the recurrent neural network layer to obtain a motion trend feature of the ice floe at the corresponding time point. It can be understood that multiple pieces of historical motion information are sequentially input into the spatiotemporal relationship layer in chronological order for processing, and each piece of historical motion information can obtain the corresponding motion trend feature. Finally, multiple motion trend features obtained from multiple pieces of historical motion information are concatenated and input into the fully connected layer.

Therefore, in combination with the multiple motion trend features obtained in the above embodiment, step S2 further includes:

S2-2, processing multiple motion trend features obtained from multiple pieces of historical motion information through the fully connected layer to obtain the motion prediction information of the ice floe in the to-be-navigated region.

Of course, in some other embodiments, only the motion trend feature obtained from the last historical motion information can be input into the fully connected layer for processing. Therefore, when implementing the solution, one of the embodiments can be selected as needed, and this embodiment does not impose specific limitations on this aspect.

In this way, multiple pieces of historical motion information of the ice floe at different time points are first obtained by analyzing historical images; then, multiple pieces of historical motion information of the ice floe at different time points is input into the motion prediction model for analyzing the spatiotemporal relationship, so as to obtain the motion prediction information of the ice floe in the to-be-navigated region. Compared with the deficiency of directly using images of the to-be-navigated region to predict the motion status information of the ice floe, the present embodiment utilizes multiple pieces of historical motion information of the ice floe to avoid interference from factors such as ice floe fragmentation, melting, and deformation, thereby achieving a better prediction effect on the motion information of ice floe in an edge region of the ice floe.

Figure 3:
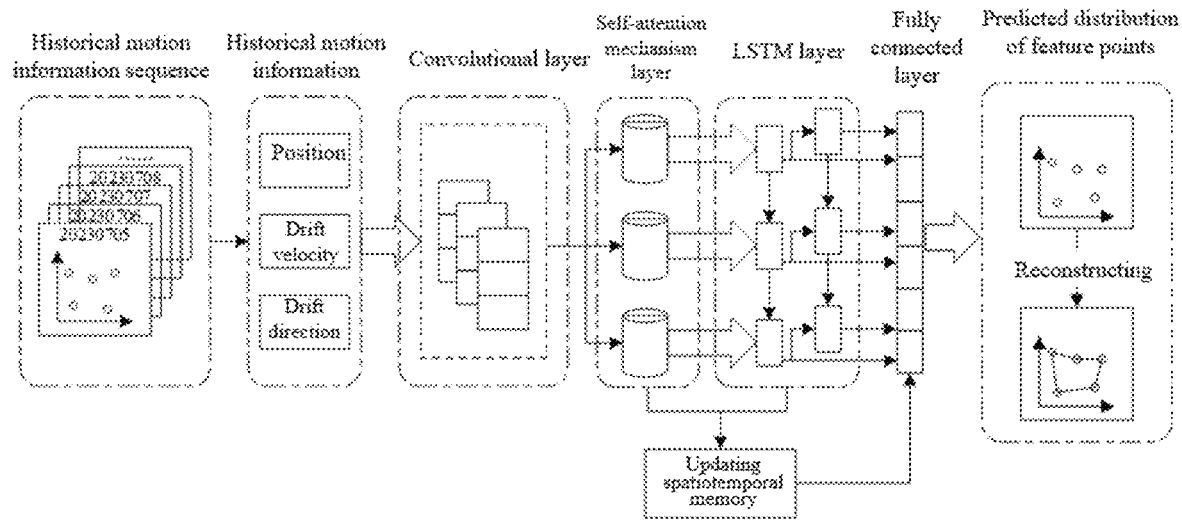
FIG. 3 is a structural schematic diagram of a motion prediction model provided in the embodiment of the present disclosure.

Exemplarily, assuming that the feature extraction layer is a convolutional layer, the feature enhancement layer is a self-attention mechanism layer, and the recurrent neural network layer is a convolutional long short-term memory network layer, the structure of the motion prediction model is as shown in FIG. 3. Based on the model structure shown in FIG. 3, the historical motion information of ice floe over the past 5-10 days (including parameters such as latitude, longitude, speed, direction, and drift distance of the of ice floe feature points) is processed using the convolutional layer for feature extraction. The extracted features are then input into the self-attention layer for feature enhancement. Subsequently, the enhanced features are input into the convolutional long short-term memory network layer for spatiotemporal analysis, where spatiotemporal memory obtained from the historical motion information sequence is updated during the analysis to obtain motion trend features. Finally, the 10 motion trend features obtained from 5-10 days of historical motion information are concatenated and input into the fully connected layer. After being processed by the fully connected layer, the predicted distribution of ice floe feature points is output, and based on the predicted distribution of feature points, the motion prediction information of the ice floe is reconstructed. The motion prediction information can include the position, drift speed, and drift direction of the ice floe for the next 1-2 days.

Of course, before performing predictions, the motion model in the above embodiment needs to be trained using a model with the same structure. The training process follows a conventional supervised learning approach in the field. During model training, the loss value is used as the objective function, which measures the error between the predicted ice floe motion and the ice floe motion detected by remote sensing. As the number of training iterations increases, if the error decreases, it indicates better training performance, meaning the loss value continuously decreases throughout the training process. Additionally, the embodiment can compare several commonly used loss functions (mean squared error, cross-entropy loss, mean absolute error, and logarithmic loss) and select the most suitable loss function to address the nonlinear problem of predicting ice floe motion trajectories.

Finally, based on the input feature point positions and their related variables, the dataset is divided into a training set and a validation set. After each training round, the average loss value of the entire dataset is calculated through the forward propagation process. The synchronization of loss value reduction in both training and validation is used as a judgment criterion. Then, through backpropagation, the parameters in the network model are continuously adjusted to ultimately obtain an optimal set of parameters for the network, including the number of convolutional layers, the number of convolution kernels, and the time dependency.

Figure 4:
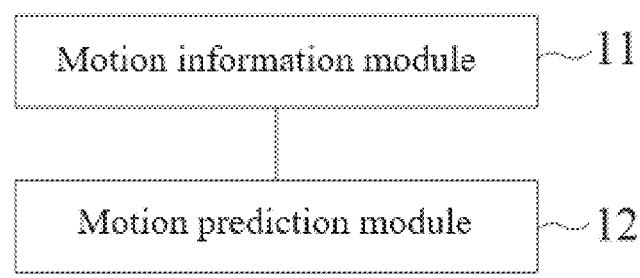
FIG. 4 is a structural schematic diagram of an ice floe motion prediction device provided in the embodiment of the present disclosure.

Based on the same inventive concept as the ice floe motion prediction method provided in the embodiment, the present embodiment also provides an ice floe motion prediction device. The device includes at least one software function module, which can be stored in a memory in software form or embedded in the electronic device. The processor in the electronic device is configured to execute the executable module stored in the memory, for example, the software function module and computer program included in the ice floe motion prediction device. Referring to FIG. 4, the device can include the following functional components:

a motion information module 11, configured for acquiring a historical motion information sequence of ice floe in a to-be-navigated region, wherein the historical motion information sequence comprises multiple pieces of historical motion information of the ice floe at different time points; and a motion prediction module 12, configured for invoking a motion prediction model to analyze a spatiotemporal relationship of the multiple pieces of historical motion information, and obtaining motion prediction information of the ice floe in the to-be-navigated region.

In the present embodiment, the motion information module 11 is configured to implement step S1 in FIG. 1, and the motion prediction module 12 is configured to implement step S2 in FIG. 1. Therefore, detailed descriptions of the above modules can be found in the specific embodiments of the corresponding steps and will not be repeated herein. Of course, since the ice floe motion prediction device provided in the present embodiment shares the same inventive concept as the method, the above modules can also be used to implement other steps or sub-steps of the method.

Further, each functional module in each embodiment of the present disclosure can be integrated together to form a separate part, or each module may exist separately, or two or more modules may be integrated to form a separate part.

It should also be understood that if the above embodiments are implemented in the form of software function modules and sold or used as independent products, they can be stored in a computer-readable storage medium. Based on this understanding, the technical solution of the present disclosure can essentially be embodied in the form of a software product, which contributes to or includes parts in the prior art. The software product is stored in a storage medium and includes multiple instructions for causing a computer device (which can be a personal computer, server, network device, etc.) to execute all or some of the steps of the methods described in various embodiments of the present disclosure.

Therefore, the embodiment also provides a storage medium, and the storage medium is a computer-readable storage medium. The storage medium stores a computer program, and, when the computer program is executed by a processor, the ice floe motion prediction method provided in the embodiment is implemented. The storage medium can be a USB flash drive, a mobile hard disk, a read-only memory (ROM), a random access memory (RAM), a magnetic disk or an optical disk, or any other medium that can store program codes.

Figure 5:
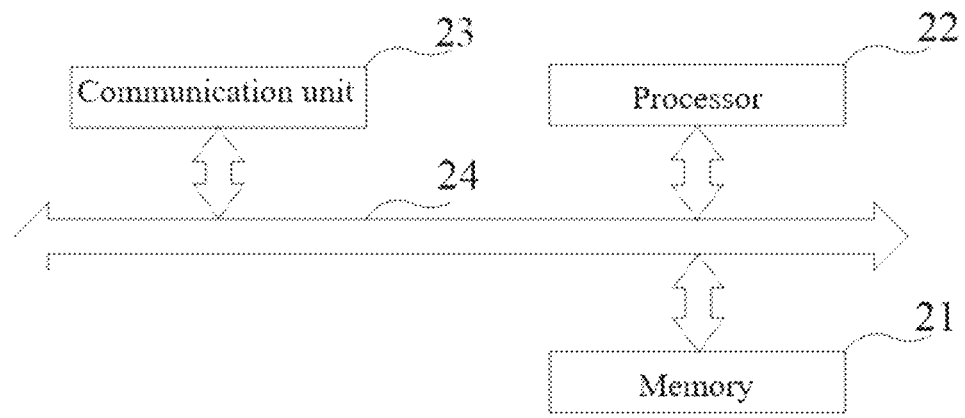
FIG. 5 is a structural schematic diagram of an electronic device provided in the embodiment of the present disclosure.

This embodiment provides an electronic device for implementing the ice floe motion prediction method. As shown in FIG. 5, the electronic device can include a processor 22 and a memory 21. Moreover, the memory 21 stores a computer program, and the processor executes the computer program stored in memory 21 to implement the ice floe motion prediction method provided in the present embodiment.

Referring to FIG. 5, the electronic device further includes a communication unit 23. The memory 21, processor 22, and communication unit 23 are electrically connected to each other, either directly or indirectly, via a system bus 24 to facilitate data transmission or interaction.

The memory 21 can be an information recording device based on any electronic, magnetic, optical, or other physical principles, configured for storing execution instructions, data, and the like. In some embodiments, the memory 21 can include, but is not limited to, volatile memory, non-volatile memory, and storage drives.

In some embodiments, the volatile memory can be random access memory (RAM). In certain embodiments, the non-volatile memory can be a read-only memory (ROM), programmable read-only memory (PROM), erasable programmable read-only memory (EPROM), electrically erasable programmable read-only memory (EEPROM), flash memory, and the like. In some embodiments, the storage drive can be a magnetic disk drive, solid-state drive, any type of storage disk (such as optical disk, DVD, etc.), or similar storage media, or any combination thereof.

The communication unit 23 is configured for transmitting and receiving data over a network. In some embodiments, the network can include wired networks, wireless networks, optical fiber networks, remote communication networks, intranets, the Internet, local area networks (LAN), wide area networks (WAN), wireless local area networks (WLAN), metropolitan area networks (MAN), public switched telephone networks (PSTN), Bluetooth networks, ZigBee networks, or near field communication (NFC) networks, or any combination thereof. In some embodiments, the network can include one or more network access points. For example, the network can include wired or wireless network access points, such as base stations and/or network switching nodes. One or more components of the service request processing system can connect to the network through these access points to exchange data and/or information.

The processor 22 can be an integrated circuit chip with signal processing capability, and it can include one or more processing cores (e.g., a single-core processor or a multi-core processor). For illustrative purposes only, the processor can include a central processing unit (CPU), application-specific integrated circuit (ASIC), application-specific instruction-set processor (ASIP), graphics processing unit (GPU), physics processing unit (PPU), digital signal processor (DSP), field programmable gate array (FPGA), programmable logic device (PLD), controller, microcontroller unit, reduced instruction set computing (RISC) processor, microprocessor, or any combination thereof.

It should be understood that the structure shown in FIG. 5 is merely illustrative. The electronic device can include more or fewer components than those shown in FIG. 5 or can be configured differently from what is depicted in FIG. 5. The components shown in FIG. 5 can be implemented using hardware, software, or a combination thereof.

It should be understood that the devices and methods disclosed in the above embodiments can also be implemented in other ways. The device embodiments described above are merely illustrative. For example, the flowcharts and diagrams in the drawings illustrate possible implementations, architectures, functions, and operations of devices, methods, and computer program products according to multiple embodiments of the present disclosure. At this point, each box in the flowchart or diagram can represent a module, program segment, or part of the code. Each part of the module, program segment, or code includes one or more executable instructions for implementing the specified logical functions. It should also be noted that in some alternative implementations, the functions indicated in the boxes may occur in a different order than those indicated in the drawings. For example, two consecutive boxes can actually be executed in parallel, and sometimes they can also be executed in reverse order, depending on the functionality involved. It should also be noted that each box in the block diagram and/or flowchart, and the combination of boxes in the block diagram and/or flowchart, can be implemented by specialized hardware systems designed to perform the specified functions or actions, or by a combination of specialized hardware and computer instructions.

The above are only various embodiments of the present disclosure, but the scope of protection of the present disclosure is not limited thereto. Any person skilled in the art can easily envisage changes or substitutions within the technical scope disclosed in the present disclosure, which should be encompassed within the scope of protection of the present disclosure. Therefore, the scope of protection of the present disclosure shall be stated to be subject to the scope of protection of the claims.

The invention claimed is:

1. An ice floe motion prediction method, wherein the method comprises:
   acquiring a historical motion information sequence of ice floe in a to-be-navigated region, wherein the historical motion information sequence comprises multiple pieces of historical motion information of the ice floe at different time points, wherein the step comprises:
   acquiring multiple historical images captured at different time points in the to-be-navigated region;
   pairing every two historical images at adjacent time points into an image group based on the multiple historical images;
   fusing, for every image group, a first feature point sequence and a second feature point sequence of each historical image in the image group to obtain a fused feature point sequence of each historical image in the image group, wherein the first feature point sequence comprises corner points distributed uniformly, and the second feature point sequence comprises feature points distributed at texture positions;

processing the fused feature point sequence of each historical image in the image group through a feature point matching model to obtain a position of the ice floe in each historical image in the image group; and obtaining one piece of historical motion information corresponding to the image group in the historical motion information sequence based on the position of the ice floe in each historical image within the image group; and invoking a motion prediction model to analyze a spatiotemporal relationship of the multiple pieces of historical motion information, and obtaining motion prediction information of the ice floe in the to-be-navigated region.

2. The ice floe motion prediction method according to claim 1, wherein the motion prediction model comprises a spatiotemporal relationship layer and a fully connected layer; and the step of invoking a motion prediction model to analyze a spatiotemporal relationship of the multiple pieces of historical motion information, and obtaining motion prediction information of the ice floe in the to-be-navigated region comprises:

processing acquired historical spatiotemporal features and the historical motion information through the spatiotemporal relationship layer for each piece of historical motion information to obtain a motion trend feature of the ice floe at a corresponding time point, wherein the historical spatiotemporal features represent features extracted by the spatiotemporal relationship layer from the processed historical motion information; and processing multiple motion trend features obtained from the multiple pieces of historical motion information through the fully connected layer to obtain the motion prediction information of the ice floe in the to-be-navigated region.

3. The ice floe motion prediction method according to claim 2, wherein the spatiotemporal relationship layer comprises a feature extraction layer, a feature enhancement layer, and a recurrent neural network layer; and the step of processing acquired historical spatiotemporal features and the historical motion information through the spatiotemporal relationship layer to obtain a motion trend feature of the ice floe at a corresponding time point comprises:

extracting features from the historical motion information through the feature extraction layer to obtain initial features of the historical motion information;

enhancing the initial features through the feature enhancement layer to obtain enhanced features of the initial features; and processing the historical spatiotemporal features and the enhanced features through the recurrent neural network layer to obtain the motion trend feature of the ice floe at the corresponding time point.

4. The ice floe motion prediction method according to claim 3, wherein the feature enhancement layer is a self-attention mechanism layer, and the recurrent neural network layer is a convolutional long short-term memory network layer.

5. The ice floe motion prediction method according to claim 1, wherein each piece of historical motion information comprises a position, a motion speed, and a motion direction of the ice floe.

6. A non-transitory storage medium, wherein the storage medium stores a computer program, and, when the computer program is executed by a processor, the ice floe motion prediction method according to claim 1 is implemented.

7. An electronic device, wherein the electronic device comprises a processor and a memory, the memory stores a computer program, and when the computer program is executed by the processor, the ice floe motion prediction method according to claim 1 is implemented.

8. An electronic device comprising a processor, a memory, and an ice floe motion prediction device, wherein the device comprises:

a motion information module, acquiring a historical motion information sequence of ice floe in a to-be-navigated region, wherein the historical motion information sequence comprises multiple pieces of historical motion information of the ice floe at different time points, wherein the motion information module is further configured to:

acquire multiple historical images captured at different time points in the to-be-navigated region;

pair every two historical images at adjacent time points into an image group based on the multiple historical images;

fuse, for every image group, a first feature point sequence and a second feature point sequence of each historical image in the image group to obtain a fused feature point sequence of each historical image in the image group, wherein the first feature point sequence comprises corner points distributed uniformly, and the second feature point sequence comprises feature points distributed at texture positions;

process the fused feature point sequence of each historical image in the image group through a feature point matching model to obtain a position of the ice floe in each historical image in the image group; and obtain one piece of historical motion information corresponding to the image group in the historical motion information sequence based on the position of the ice floe in each historical image within the image group; and a motion prediction module, invoking a motion prediction model to analyze a spatiotemporal relationship of the multiple pieces of historical motion information, and obtaining motion prediction information of the ice floe in the to-be-navigated region.

* * * * *